(12) United States Patent
Gove

(10) Patent No.: US 7,478,371 B1
(45) Date of Patent: Jan. 13, 2009

(54) METHOD FOR TRACE COLLECTION

(75) Inventor: Darryl J. Gove, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 714 days.

(21) Appl. No.: 10/690,056

(22) Filed: Oct. 20, 2003

(51) Int. Cl.
*G06F 9/44* (2006.01)

(52) U.S. Cl. .................. 717/128; 717/130; 717/151; 717/158

(58) Field of Classification Search .................. 717/130
See application file for complete search history.

(56) References Cited

U.S. PATENT DOCUMENTS

| | | | | |
|---|---|---|---|---|
| 6,026,236 A | * | 2/2000 | Fortin et al. | 717/127 |
| 6,804,814 B1 | * | 10/2004 | Ayers et al. | 717/135 |
| 6,898,785 B2 | * | 5/2005 | Ramasamy et al. | 717/129 |
| 7,137,105 B2 | * | 11/2006 | Madsen et al. | 717/128 |
| 7,140,008 B2 | * | 11/2006 | Chilimbi et al. | 717/158 |
| 7,143,396 B2 | * | 11/2006 | Suresh | 717/130 |
| 2005/0071819 A1 | * | 3/2005 | Calyanakoti et al. | 717/128 |

\* cited by examiner

*Primary Examiner*—Tuan Q Dam
*Assistant Examiner*—Thuy Dao
(74) *Attorney, Agent, or Firm*—Martine Penilla & Gencarella, LLP

(57) ABSTRACT

A method is provided for obtaining data to be used in evaluating performance of a computer processor. More specifically, the method provides for efficiently obtaining traces from an application program for use in a simulation of a computer processor. The method uses both an original code defining the application program and an instrumented version of the original code ("instrumented code"). The method includes apportioning a total time of execution of the application program between the original code and the instrumented code. Transition of execution between the original and instrumented codes is conducted through either modification of function calls or through consultation with a mapping of instruction address correspondences between the original and instrumented codes.

20 Claims, 7 Drawing Sheets

METHOD FOR TRACE COLLECTION

BACKGROUND OF THE INVENTION

1. Field of the Invention

The present invention relates generally to computer processor design. More specifically, the present invention relates to evaluation of computer processor performance.

2. Description of the Related Art

When designing a computer processor ("processor"), the processor performance is often evaluated by observing behavior of the processor during execution of one or more benchmark applications. Typically, the processor being designed has not yet been manufactured; therefore, a simulation of the processor is used to execute the benchmark applications. Input for the simulation of the processor is represented as a set of instructions to be performed by the processor. Observation of the processor behavior during simulation is useful for identifying aspects of the processor design that can be improved. Since processors are generally expected to execute a broad spectrum of applications, it is desirable to establish a set of input instructions for simulation of the processor that is representative of a similarly broad spectrum of applications.

In view of the foregoing, a need exists for a method for establishing a set of input instructions to be used in simulation of a processor. It is desirable that the method be sufficiently efficient to allow establishment of a set of instructions that is representative of a broad spectrum of applications.

SUMMARY OF THE INVENTION

Broadly speaking, an invention is disclosed for a method for obtaining data to be used in evaluating performance of a computer processor. More specifically, the present invention provides a method for efficiently obtaining traces from an application program ("program") for use in a simulation of a computer processor. The traces represent a record of events associated with execution of portions of the program. The traces are suitable for use in a simulation of the computer processor under evaluation. Performance results obtained from the simulation can be used to optimize a design of the computer processor.

The method of the present invention uses both an original code defining the program and an instrumented version of the original code ("instrumented code"). The method includes apportioning a total time of execution of the program between the original code and the instrumented code. The apportionment of the total time of execution between the original code and instrumented code is defined to balance an acquisition of traces from the instrumented code with an acceptable total time of execution. Furthermore, apportionment of execution time between the original code and the instrumented code is defined such that the each of the original code and the instrumented code is executed in an alternating manner, thus allowing traces to be obtained from various portions of the program. In one embodiment, transition of execution between the original and instrumented codes is conducted through modification of function calls. In another embodiment, transition of execution between the original and instrumented codes is conducted using a mapping of instruction address correspondences between the original and instrumented codes.

In one embodiment, a method for obtaining traces is disclosed. The method includes executing an original set of instructions. Execution is then switched from the original set of instructions to an instrumented version of the original set of instructions. The method further includes generating traces through execution of one or more instrumentation instructions contained within the instrumented version of the original set of instructions.

In another embodiment, another method for obtaining traces is disclosed. The method includes executing an original code. The method also includes an operation for switching execution from the original code to an instrumented code. The instrumented code is then executed. In conjunction with executing the instrumented code, the method further includes generating traces. An operation is also provided for switching execution from the instrumented code back to the original code.

In another embodiment, a computer readable media containing program instructions for obtaining traces is disclosed. The computer readable media includes program instructions for executing an original code. Program instructions are also provided for switching execution from the original code to an instrumented code and executing the instrumented code. The computer readable media further includes program instructions for generating traces in conjunction with executing the instrumented code. Program instructions are also provided for switching execution from the instrumented code back to the original code.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1A:
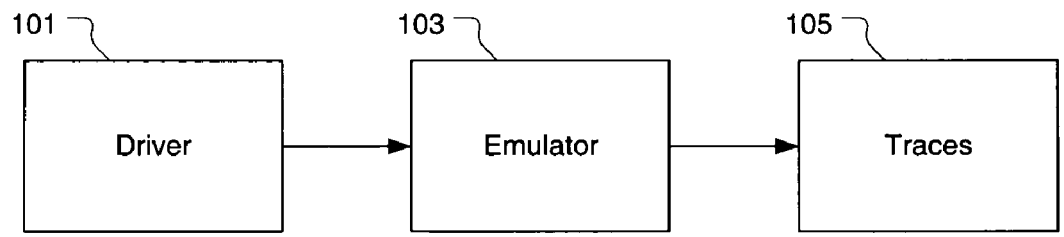
FIG. 1A is an illustration showing a process used to obtain traces for a program.

The present invention provides a method for obtaining data to be used in evaluating performance of a computer processor. More specifically, the present invention provides a method for efficiently obtaining traces from an application program ("program") for use in a simulation of a computer processor. The traces represent a record of events associated with execution of portions of the program. The traces are suitable for use in a simulation of the computer processor under evaluation. Performance results obtained from the simulation can be used to optimize a design of the computer processor.

The method of the present invention uses both an original code defining the program and an instrumented version of the original code ("instrumented code"). The method includes apportioning a total time of execution of the program between the original code and the instrumented code. The apportionment of the total time of execution between the original code and instrumented code is defined to balance an acquisition of traces from the instrumented code with an acceptable total time of execution. Furthermore, apportionment of execution time between the original code and the instrumented code is defined such that the each of the original code and the instrumented code is executed in an alternating manner, thus allowing traces to be obtained from various portions of the program. In one embodiment, transition of execution between the original and instrumented codes is conducted through modification of function calls. In another embodiment, transition of execution between the original and instrumented codes is conducted using a mapping of instruction address correspondences between the original and instrumented codes.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

When designing a computer processor ("processor"), the processor performance is analyzed by executing a wide range of programs (e.g., real applications, benchmark applications, etc. . . . ) on a virtual simulation of the processor. Examples of data obtained from the virtual simulation of the processor include a number of cycles required per instruction and a rate at which instructions are completed. Additional examples of data obtained from the virtual simulation of the processor include information regarding locations where instruction processing stalls occur within the processor, frequencies at which stalls occur, and a significance of particular stalls. The data obtained from the virtual simulation of the processor is used to provide feedback for optimizing the processor design.

The virtual simulation of the processor is performed using traces obtained from a program. Each trace represents a record of events associated with processing one or more instructions of the program. The record of events constituting a trace can include a variety of information such as an instruction address being performed, an instruction type being performed, and data involved in performing the instruction. It should be appreciated by those skilled in the art that traces can include many other types of information not specifically cited in the present exemplary discussion. Additionally, each trace can represent a variable sized portion of a program. For example, a trace can represent a range of instructions in a program extending from a single instruction to all instructions. Once obtained, the traces are run through a simulator to provide a virtual simulation of the processor activity.

FIG. 1A is an illustration showing a process used to obtain traces for a program. A driver 101 represents a computing system (i.e., processor and associated devices) that is used to direct an emulation of the program. The driver 101 communicates instructions and data associated with the program to an emulator 103. The emulator 103 represents a virtual computing system capable of generating traces 105 of the program. The emulator 103 emulates each communicated instruction that is received. In one embodiment, instrumentation instructions embedded within a set of instructions defining the program direct the emulator to generate traces 105. The emulator 103 effectively acts as a processor; however, in various embodiments, the emulator 103 will execute the program at a rate that is hundreds of thousands times slower than an actual processor. Therefore, time requirements associated with the process of obtaining a trace via the emulator 103 may not scale to time requirements of the driver 101 (i.e., actual processor running at normal speed). Additionally, when multiple processors are interfaced to execute a program, time requirements associated with the emulator 103 may cause all of the multiple processors to be slowed down.

The driver 101 can be scaled to operate at a slower rate that is more compatible with execution of the program by the emulator 103. It is possible, however, for the characteristics of driver 101 to be a function of the scale that is applied to the driver 101. Thus, there is a potential that the driver 101 will operate differently when scaled down than when allowed to operate at a normal speed. For example, when the driver 101 is scaled down in speed to accommodate the emulator 103, timeout requirements and associated effects that would be manifested at normal operating speed of the driver 101 may be artificially biased by the scaled down speed of the driver 101. Furthermore, a bias introduced into the characteristics of the driver 101 can propagate forward through the emulator 103 to the traces 105. Therefore, traces 105 obtained from the emulator 103 that is driven by the scaled down driver 101 may not be representative of execution of the program in real time. Thus, it is beneficial to have a method for obtaining traces that does not require the driver 101 to be scaled to accommodate a slower speed at which the emulator 103 can execute the program. As discussed later, the present invention provides such a method.

Figure 1B:
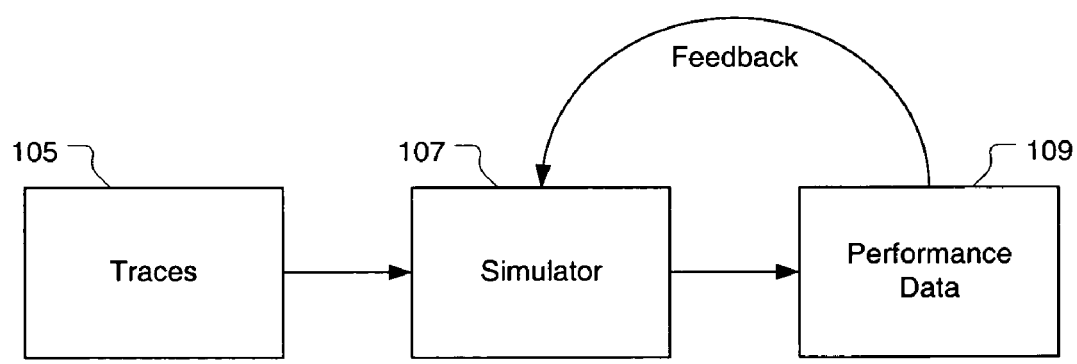
FIG. 1B is an illustration showing a process used to inform processor design decisions.

FIG. 1B is an illustration showing a process used to inform processor design decisions. The traces 105 of the program as obtained from the emulator 103 are communicated to a simulator 107. The simulator 107 is a virtual representation of an actual processor to be analyzed. The simulator 107 is capable of receiving the traces 105 and using the information contain within the traces 105 to perform a true simulation of the associated processor activity. Performance data 109 pertaining to the associated processor activity is provided by the simulator 107. The performance data 109 can be used as feedback for optimizing a design of the processor. In one embodiment, the processor design is virtual optimized in the simulator 107 through numerous iterations using the performance data 109.

The simulator 107 operates at a much slower (tens of thousands to hundreds of thousands times slower) speed than a physical processor. Therefore, simulation of entire programs is often not feasible. For example, consider a program that normally executes to completion in 60 minutes on a physical processor. If the simulator 107 is capable of operating at ¹⁄₁₀₀₀₀ the speed of the physical processor, a trace of the entire program will be executed by the processor in 600000 minutes or about 417 days. Thus, performing a simulation using a trace representing every instruction in a program incurs a high cost. As an alternative to developing a trace for an entire program, a number of smaller traces can be developed, with each smaller trace representing a portion of the entire program. In one embodiment, the smaller traces are developed to provide a representative sample of the entire program. The smaller traces are then executed by the simulator 107 to obtain processor performance data that is representative of the program as a whole. In one embodiment, the smaller traces are generated by a number of instrumentation instructions inserted in the set of instructions defining the program.

Figure 2:
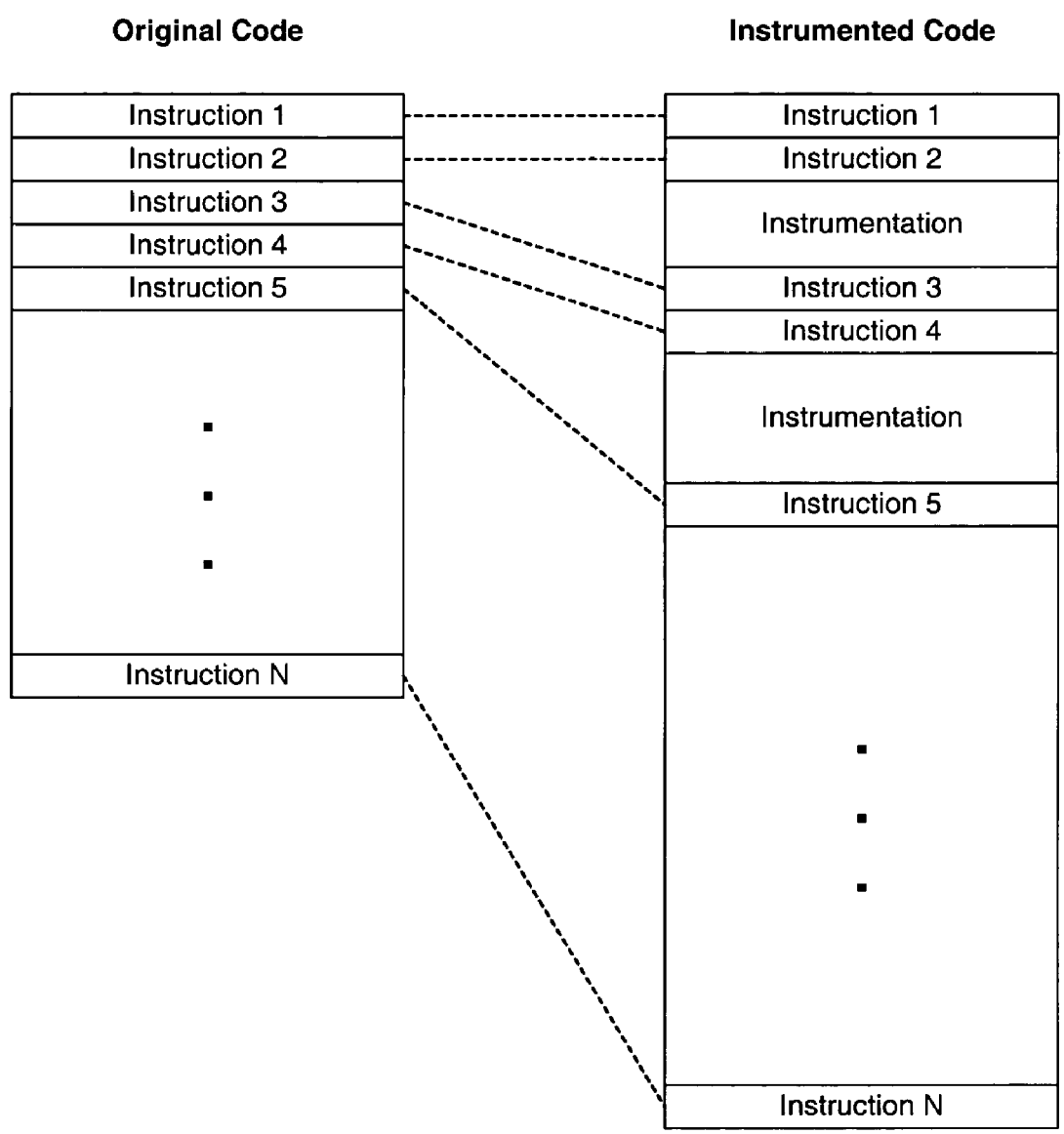
FIG. 2 is an illustration showing a relationship between an original code and an instrumented version of the original code, in accordance with one embodiment of the present invention.

FIG. 2 is an illustration showing a relationship between an original code and an instrumented version of the original code, in accordance with one embodiment of the present invention. The original code includes a number of instructions extending from instruction 1 to instruction N, where N represents the total number of instructions. The instrumented version of the original code ("instrumented code") includes one or more instrumentation instructions in addition to each of instructions 1 to N contained in the original code. The instrumentation instructions serve to generate traces representing records of events associated with processing one or more of instructions 1 to N. An arrangement of instrumentation instructions within the instrumented code can be defined as necessary to provide required trace generation. Instrumentation of a program for generating traces can cause the program to execute 3 to 10 times slower than normal, depending on the number and invasiveness of instrumentation instructions present. Thus, the amount of trace generation needs to be balanced against the amount of time required to generate the traces. The present invention provides a method for efficiently obtaining traces that are representative of an entire program within an acceptable amount of time.

The method of the present invention obtains traces for a program through utilization of both the original code and the instrumented code of the program. The method includes executing the program by alternating between the original code and the instrumented code. When executing the program using the original code, execution will proceed at a normal rate. However, when executing the program using the instrumented code, execution will proceed at a slower rate due to trace generation. In one embodiment, both the original code and the instrumented code are executed using a physical processor, as opposed to an emulator. In another embodiment, the original code is executed using a physical processor and the instrumented code is executed using an emulator. Also, in one embodiment, a third-party program is provided for directing a transfer of execution between the original code and the instrumented code.

Various conditions can be applied for causing execution to alternate between the original code and the instrumented code. In one embodiment, alternating execution between the original code and the instrumented code is directed on a time basis. For example, the original code may be allowed to execute 90% of the time and the instrumented code executes the remaining 10% of the time. It should be appreciated, however, that a time balance between execution of the original code and the instrumented code can be defined in any manner suitable for a particular situation. In one embodiment, the time allowed for execution of the instrumented code is dispersed throughout the program. With respect to the present example, the original code may be directed to execute for separated periods of about 0.9 second with intervening execution of the instrumented code for a period of about 0.1 second. If it is considered that the instrumented code executes three times slower than the original code and the original code executes at normal speed, the application program will execute to completion in about 120% of the normal execution time. Thus, in the present example, a number of traces will be obtained from distributed locations throughout the program with an associated increase in execution time of about 20%. Hence, the method of the present invention allows for efficient generation of a number of traces that are representative of a statistical sampling of the program. Furthermore, since the method of the present invention provides for generation of traces with a relatively minor increase in execution time of a program, traces can be obtained more easily for a broader spectrum of programs. Thus, a compilation of traces representing a broad spectrum of programs can be made available during subsequent simulation to render a more complete analysis of processor performance.

Figure 3:
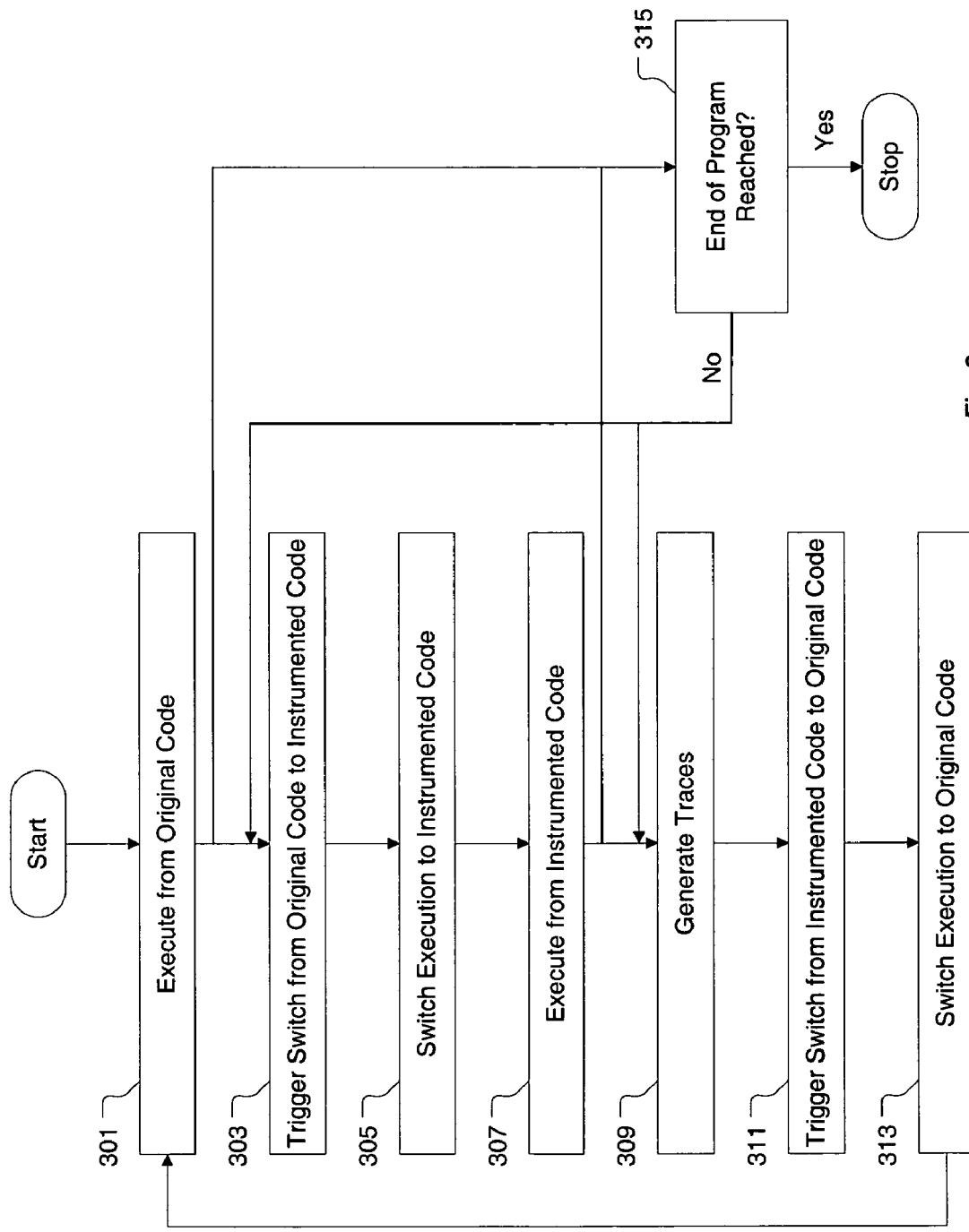
FIG. 3 is an illustration showing a flowchart of a method for obtaining traces from a program, in accordance with one embodiment of the present invention.

FIG. 3 is an illustration showing a flowchart of a method for obtaining traces from a program, in accordance with one embodiment of the present invention. The method includes an operation 301 in which an original code is executed. The original code represents an original set of instructions defining the program to be executed during normal operation. Execution of the original code is performed using an actual computing system. The method further includes an operation 303 for triggering a switch of execution from the original code to an instrumented code. The instrumented code represents an instrumented version of the original code, i.e., an instrumented version of the original set of instructions. In one embodiment, triggering the switch of execution from the original code to the instrumented code is based on an elapsed time of execution. For example, the triggering of operation 303 can be defined to occur such that the original code accounts for a particular percentage of the execution time on average. In one embodiment, the triggering of operation 303 is defined to occur such that the original code accounts for at least 90%, on average, of the elapsed time of execution. It should be appreciated, however, that other embodiments can define the triggering of operation 303 to result in different percentages of original code execution time (e.g., 80%, 85%, 95%, 99%, etc. . . . ) that are consistent with a particular objective associated with obtaining traces from the program. Furthermore, the triggering of operation 303 is defined to cause the switch of execution from the original code to the instrumented code to occur at a next location of known state in the original code.

The method continues with an operation 305 in which execution is switched from the original code to the instrumented code. The switching of execution from the original code to the instrumented code occurs at a location of known state in the original code. In an operation 307, the instrumented code is executed. In one embodiment, execution of the instrumented code is performed using an emulator capable of generating traces of the program. During execution of the instrumented code, an operation 309 is performed in which traces of the program are generated. The traces are generated through execution of one or more instrumentation instructions contained within a portion of the instrumented code being executed.

The method further includes an operation 311 for triggering a switch of execution from the instrumented code back to the original code. In one embodiment, triggering the switch of execution from the instrumented code to the original code is based on an elapsed time of execution. For example, the triggering of operation 311 can be defined to occur such that the instrumented code accounts for a particular percentage of the execution time on average. In accordance with the embodiment previously discussed with respect to the triggering of operation 303, the triggering of operation 311 is defined to occur such that the instrumented code accounts for less than 10%, on average, of the elapsed time of execution. It should be appreciated, however, that other embodiments can define the triggering of operation 311 to result in different percentages (e.g., 20%, 15%, 5%, 1%, etc. . . . ) of instrumented code execution time that are consistent with a particular objective associated with obtaining traces from the program. Furthermore, the triggering of operation 311 is defined to cause the switch of execution from the instrumented code to the original code to occur at a next location of known state in the instrumented code. Also, the triggering of operation 311 is defined to cause the switch of execution from the instrumented code to the original code to occur at an instruction that is common to both the instrumented code and the original code.

The method continues with an operation 313 in which execution is switched from the instrumented code to the original code. The method continues by reverting back to operation 301 in which the original code is executed. Additionally, an operation 315 is provided for terminating the method at the end of the program.

Figure 4:
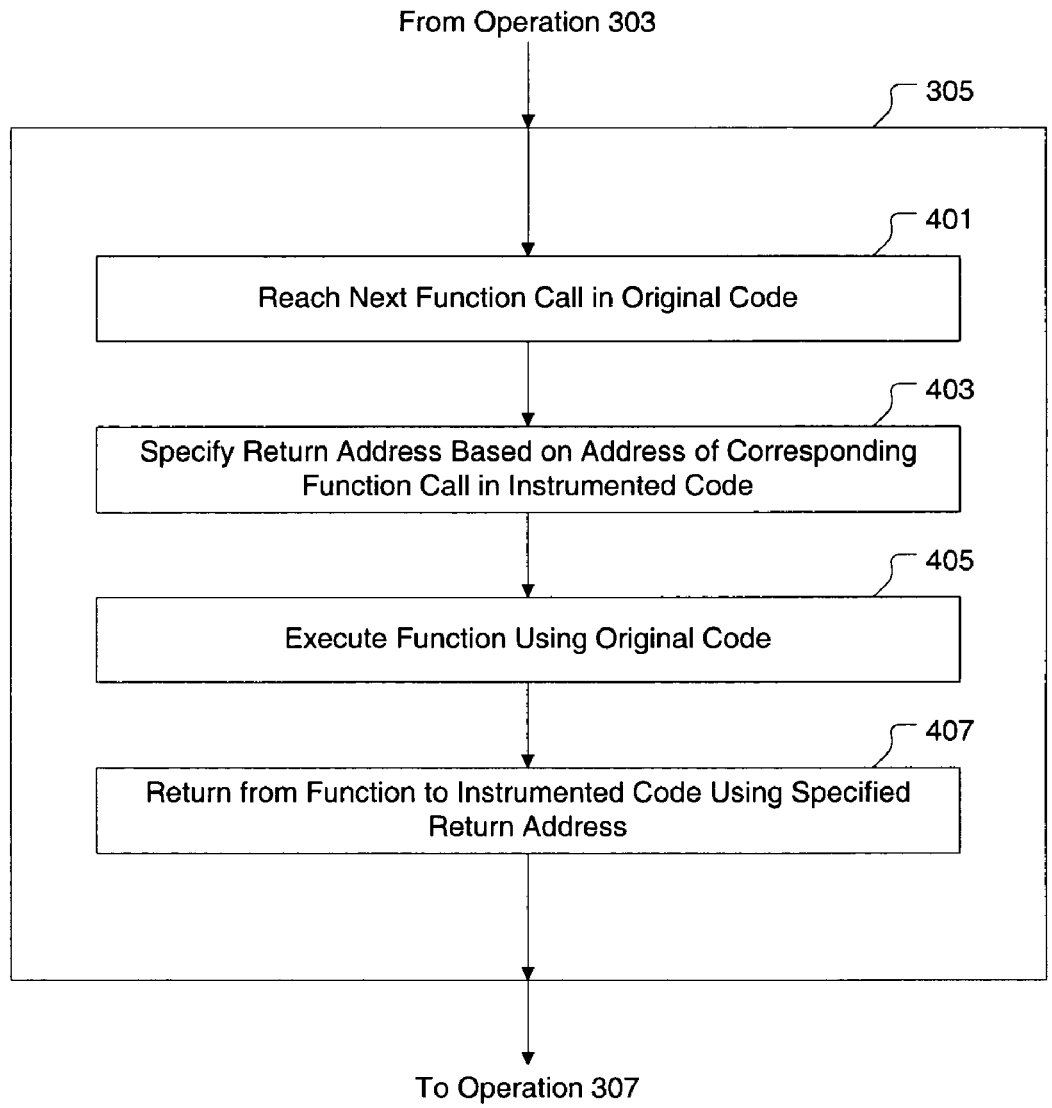
FIG. 4 is an illustration showing a flowchart for a method of using a function call to implement the switch of execution from the original code to the instrumented code as required by operation 305 of FIG. 3, in accordance with one embodiment of the present invention.

FIG. 4 is an illustration showing a flowchart for a method of using a function call to implement the switch of execution from the original code to the instrumented code as required by operation 305 of FIG. 3, in accordance with one embodiment of the present invention. In an operation 401, a next function call is reached in the original code. The next function call in the original code is also present in the instrumented code. Thus, instruction addresses are available for the next function call in both the original code and the instrumented code. An operation 403 is provided for specifying the address of the next function call in the instrumented code as a return address to be used upon completing execution of the associated function. In an operation 405, the function in the original code corresponding to the next function call is executed. Upon completing execution of the function in operation 405, an operation 407 is performed in which the return address specified in operation 403 is used to return control from the function to the instrumented code. Therefore, control is returned to the instrumented code upon completing execution of the function as if the function had been called from the instrumented code rather than the original code. The method then continues with operation 307 of FIG. 3, in which execution of the program continues using the instrumented code.

Figure 5:
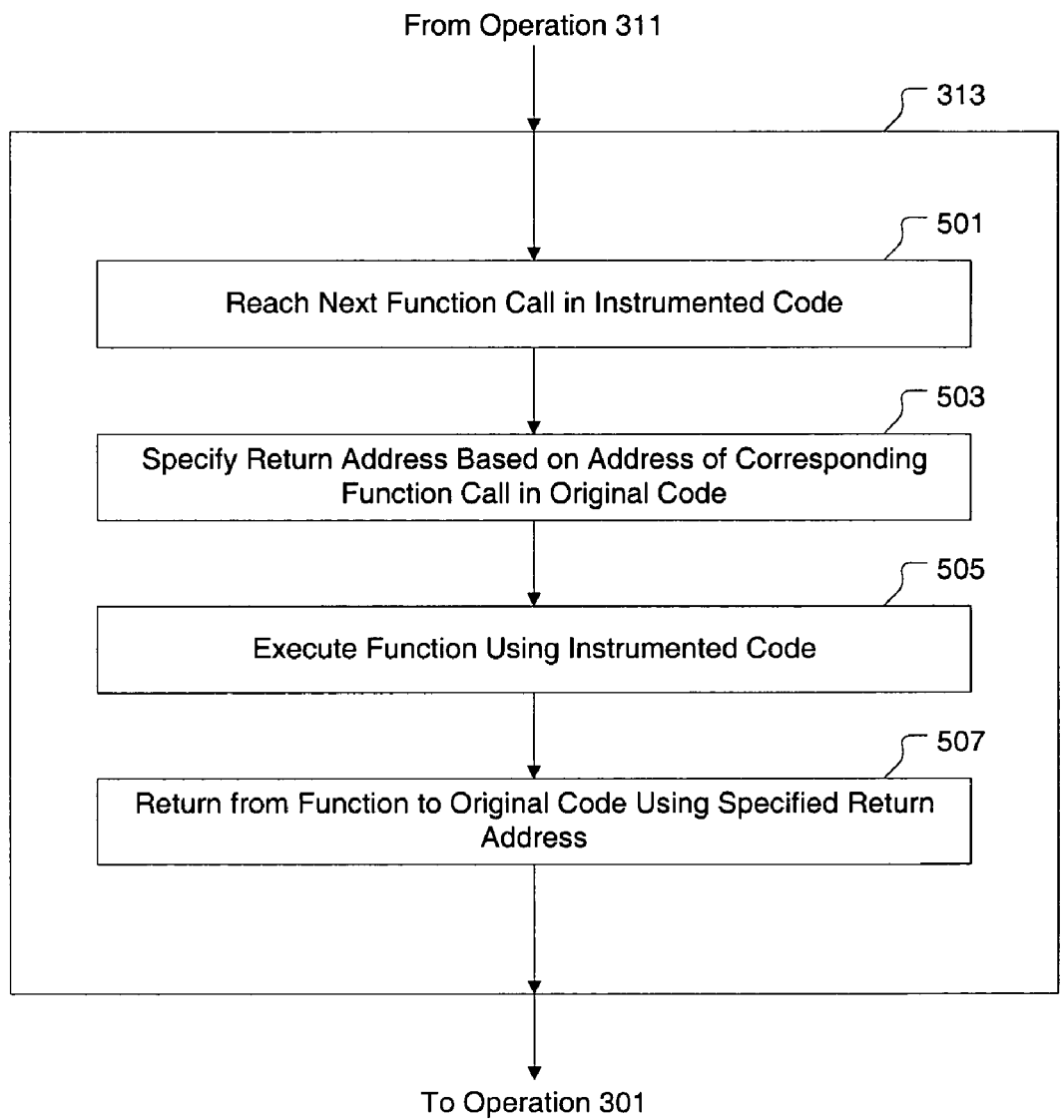
FIG. 5 is an illustration showing a flowchart for a method of using a function call to implement the switch of execution from the instrumented code to the original code as required by operation 313 of FIG. 3, in accordance with one embodiment of the present invention.

FIG. 5 is an illustration showing a flowchart for a method of using a function call to implement the switch of execution from the instrumented code to the original code as required by operation 313 of FIG. 3, in accordance with one embodiment of the present invention. The method shown in FIG. 5 is similar to the method shown in FIG. 4, with the exception that control is being transferred from the instrumented code to the original code. In an operation 501, a next function call is reached in the instrumented code. The next function call in the instrumented code is also present in the original code. Thus, instruction addresses are available for the next function call in both the instrumented code and the original code. An operation 503 is provided for specifying the address of the next function call in the original code as a return address to be used upon completing execution of the associated function. In an operation 505, the function in the instrumented code corresponding to the next function call is executed. Upon completing execution of the function in operation 505, an operation 507 is performed in which the return address specified in operation 503 is used to return control from the function to the original code. Therefore, control is returned to the original code upon completing execution of the function as if the function had been called from the original code rather than the instrumented code. The method then continues with operation 301 of FIG. 3, in which execution of the program continues using the original code.

The method of using function calls to implement the switch of execution between the original code and the instrumented code, as described with respect to FIGS. 4 and 5, is relatively easy to implement, but is restricted by the availability of function calls in the program. Therefore, trace characteristics will be dependent upon a number of function calls available for switching execution between the original and instrumented codes and a size of the associated functions. Ideally, the number of function calls and size of the associated functions is adequate to allow a switch of execution between the original and instrumented codes to occur at or near a desired frequency. However, in cases where the function calls are not adequately defined, another method for switching execution between the original the instrumented codes is available as described below with respect to FIGS. 6 and 7.

Figure 6:
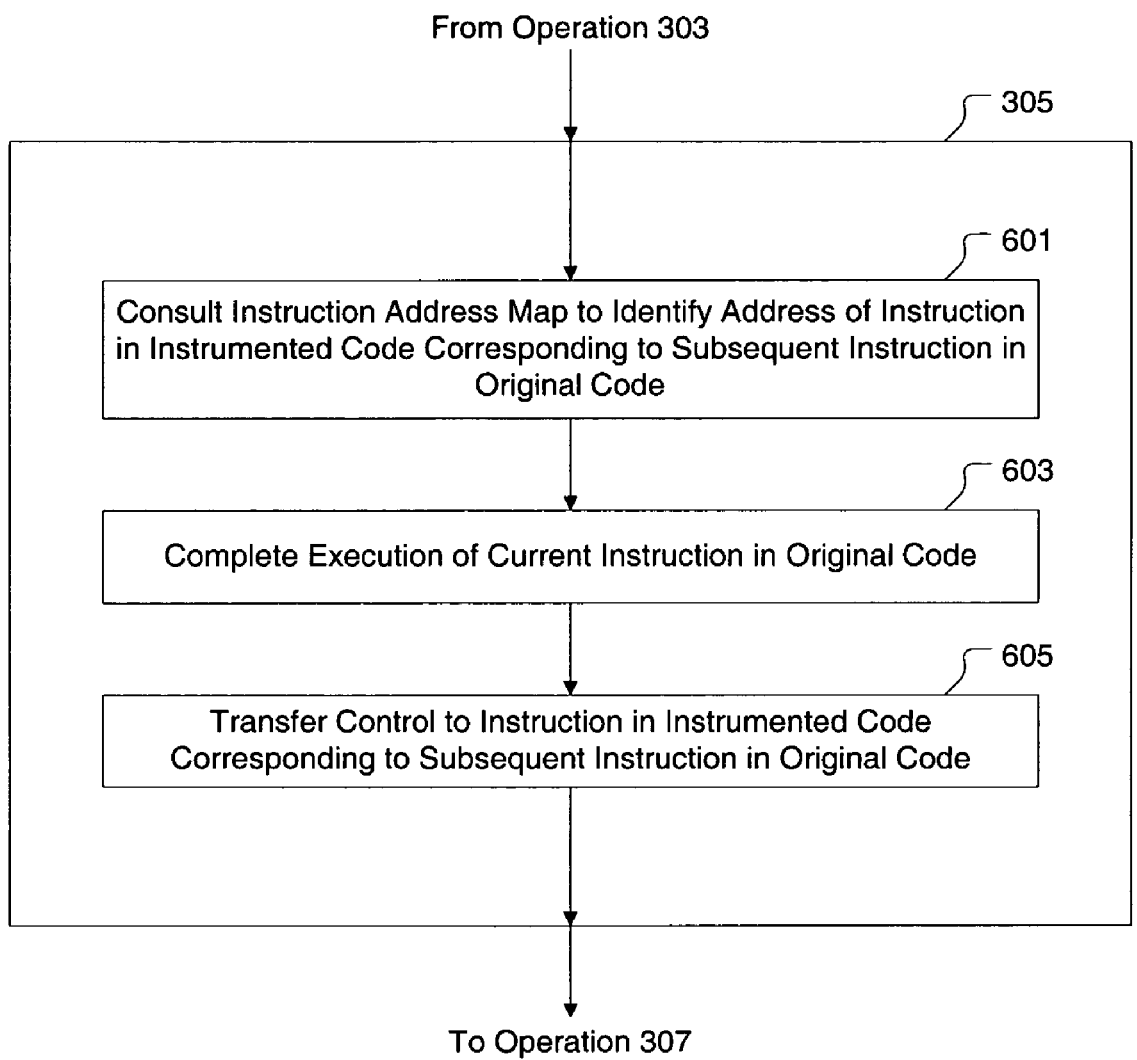
FIG. 6 is an illustration showing a flowchart for a method of using an address map to implement the switch of execution from the original code to the instrumented code as required by operation 305 of FIG. 3, in accordance with one embodiment of the present invention.

FIG. 6 is an illustration showing a flowchart for a method of using an address map to implement the switch of execution from the original code to the instrumented code as required by operation 305 of FIG. 3, in accordance with one embodiment of the present invention. The method of FIG. 6 is based upon an address map defined to identify correspondences between instruction addresses in the original code and instruction addresses in the instrumented code. Thus, for each instruction address in the original code, the address map specifies a corresponding instruction address in the instrumented code. In an operation 601, the address map is consulted to identify an instruction address in the instrumented code that corresponds to a subsequent instruction in the original code. The subsequent instruction in the original code represents an instruction in the original code that would be performed if execution of the original code were to continue upon completing execution of a current instruction in the original code. In an operation 603, execution of the current instruction in the original code is completed. Upon completing execution of the current instruction in operation 603, an operation 605 is performed in which the instruction address in the instrumented code identified in operation 601 is used to transfer control from the original code to the instrumented code. The method then continues with operation 307 of FIG. 3, in which execution of the program continues using the instrumented code.

Figure 7:
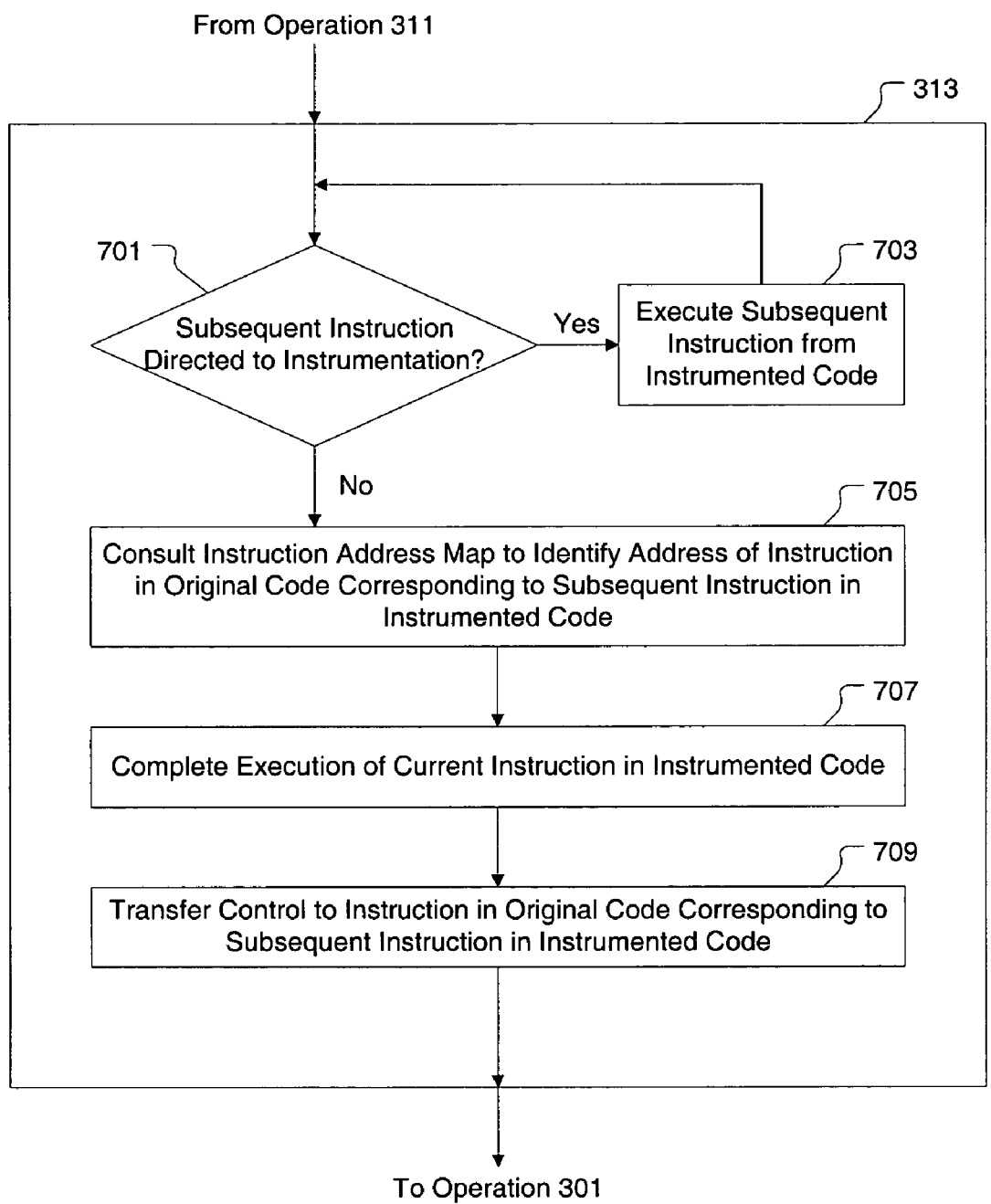
FIG. 7 is an illustration showing a flowchart for a method of using an address map to implement the switch of execution from the instrumented code to the original code as required by operation 313 of FIG. 3, in accordance with one embodiment of the present invention.

FIG. 7 is an illustration showing a flowchart for a method of using an address map to implement the switch of execution from the instrumented code to the original code as required by operation 313 of FIG. 3, in accordance with one embodiment of the present invention. In an operation 701, a determination is made as to whether a subsequent instruction in the instrumented code represents an instrumentation instruction. Since instrumentation instructions are not present in the original code, an instrumentation instruction address in the instrumented code will not have a corresponding instruction address in the original code. Therefore, if it is determined that the subsequent instruction in the instrumented code corresponds to an instrumentation instruction, an operation 703 is performed to continue execution of the instrumented code through the subsequent instruction and repeat the determination of operation 701. Upon determining in operation 701 that the subsequent instruction in the instrumented code does not correspond to an instrumentation instruction, the method continues with an operation 705. As with the method of FIG. 6, the method of FIG. 7 is based upon the address map defined to identify correspondences between instruction addresses in the original code and instruction addresses in the instrumented code. In the operation 705, the address map is consulted to identify an instruction address in the original code that corresponds to the subsequent instruction in the instrumented code. In an operation 707, execution of the current instruction in the instrumented code is completed. Upon completing execution of the current instruction in operation 707, an operation 709 is performed in which the instruction address in the original code identified in operation 705 is used to transfer control from the instrumented code to the original code. The method then continues with operation 301 of FIG. 3, in which execution of the program continues using the original code.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for obtaining traces of a program, comprising:
    (a) obtaining an original set of instructions which define the program, wherein the original set of instructions does not include an instrumentation instruction;
    (b) obtaining an instrumented version of the original set of instructions, wherein the instrumented version of the original set of instructions includes each instruction in the original set of instructions and a number of instrumentation instructions defined to generate traces, wherein the number of instrumentation instructions are dispersed in a substantially uniform manner throughout the instrumented version of the original set of instructions;
    (c) executing the original set of instructions;
    (d) switching execution from the original set of instructions to the instrumented version of the original set of instructions upon encountering a first trigger condition, wherein the first trigger condition is an elapsed time of execution of the original set of instructions, wherein encountering the first trigger condition causes the switching of execution from the original set of instructions to the instrumented version of the original set of instructions to occur at a next location of known state in the original set of instructions;
    (e) executing the instrumented version of the original set of instructions so as to generate traces through execution of one or more of the number of instrumentation instructions;
    (f) switching execution from the instrumented version of the original set of instructions back to the original set of instructions upon encountering a second trigger condition, wherein the second trigger condition is an elapsed time of execution of the instrumented version of the original set of instructions, wherein encountering the second trigger condition causes the switching of execution from the instrumented version of the original set of instructions back to the original set of instructions to occur at a next location of known state in the instrumented version of the original set of instructions; and
    (g) repeating operations (c) through (f),
    wherein each of the first trigger condition and the second trigger condition is a respective temporal period defined independently from an instruction present in either the original set of instructions or the instrumented version of the original set of instructions.

2. A method for obtaining traces of a program as recited in claim 1, wherein the switching of execution from the original set of instructions to the instrumented version of the original set of instructions occurs at a location of known state in the original set of instructions.

3. A method for obtaining traces of a program as recited in claim 1, wherein the first trigger condition is defined such that execution of the original set of instructions accounts for more than about 90 percent of a total elapsed time of execution of the program.

4. A method for obtaining traces of a program as recited in claim 1, wherein the next location of known state in the instrumented version of the original set of instructions corresponds to an instruction common to both the instrumented version of the original set of instructions and the original set of instructions.

5. A method for obtaining traces of a program as recited in claim 1, wherein the second trigger condition is defined such that execution of the instrumented version of the original set of instructions accounts for less than about 10 percent of a total elapsed time of execution of the program.

6. A method for obtaining traces of a program as recited in claim 1, wherein execution of the instrumented version of the original set of instructions is performed by an emulator.

7. A method for obtaining traces of a program, comprising:
    (a) executing an original code which defines the program, wherein the original code does not include an instrumentation instruction;
    (b) switching execution from the original code to an instrumented code upon reaching a next location of known state in the original code after having executed the original code for a specified first time period, wherein the instrumented code includes each instruction present in the original code and a number of instrumentation instructions dispersed in a substantially uniform manner throughout the instrumented code, wherein the number of instrumentation instructions are defined to generate traces;

(c) executing the instrumented code so as to generate traces through execution of one or more of the instrumentation instructions;

(d) switching execution from the instrumented code back to the original code upon reaching a next location of known state in the instrumented code after having executed the instrumented code for a specified second time period; and (e) repeating operations (a) through (d), wherein each of the specified first time period and the specified second time period is a respective temporal period defined independently from an instruction present in either the original code or the instrumented code.

8. A method for obtaining traces of a program as recited in claim 7, wherein the first and second time periods are specified such that execution of the original code accounts for more than about 90 percent of the total elapsed time of execution of both the original code and instrumented code.

9. A method for obtaining traces of a program as recited in claim 7, wherein the next location of known state in each of the instrumented code and original code corresponds to an instruction common to both the instrumented code and the original code.

10. A method for obtaining traces of a program as recited in claim 7, wherein the first and second time periods are specified such that execution of the instrumented code accounts for less than about 10 percent of the total elapsed time of execution of both the original code and instrumented code.

11. A method for obtaining traces of a program as recited in claim 7, wherein both switching execution from the original code to the instrumented code and switching execution from the instrumented code back to the original code are performed using return addresses during processing of function calls.

12. A method for obtaining traces of a program as recited in claim 7, further comprising:

defining a map of instruction addresses, the map of instruction addresses identifying correspondences between instruction addresses in the original code and instruction addresses in the instrumented code.

13. A method for obtaining traces of a program as recited in claim 12, wherein both switching execution from the original code to the instrumented code and switching execution from the instrumented code back to the original code are performed using the map of instruction addresses.

14. A computer readable storage medium containing program instructions for obtaining traces of a program, comprising:

program instructions for executing an original code, wherein the original code does not include an instrumentation instruction;

program instructions for switching execution from the original code to an instrumented code upon reaching a next location of known state in the original code after having executed the original code for a specified first time period, wherein the instrumented code includes each instruction present in the original code and a number of instrumentation instructions dispersed in a substantially uniform manner throughout the instrumented code, wherein the number of instrumentation instructions are defined to generate traces;

program instructions for executing the instrumented code so as to generate traces through execution of one or more of the instrumentation instructions; and program instructions for switching execution from the instrumented code back to the original code upon reaching a next location of known state in the instrumented code after having executed the instrumented code for a specified second time period, wherein each of the specified first time period and the specified second time period is a respective temporal period defined independently from an instruction present in either the original code or the instrumented code.

15. A computer readable storage medium containing program instructions for obtaining traces of a program as recited in claim 14, wherein the first and second time periods are specified such that execution of the original code accounts for more than about 90 percent of the total elapsed time of execution of both the original code and instrumented code.

16. A computer readable storage medium containing program instructions for obtaining traces of a program as recited in claim 14, wherein the next location of known state in each of the instrumented code and original code corresponds to an instruction common to both the instrumented code and the original code.

17. A computer readable storage medium containing program instructions for obtaining traces of a program as recited in claim 14, wherein the first and second time periods are specified such that execution of the instrumented code accounts for less than about 10 percent of the total elapsed time of execution of both the original code and instrumented code.

18. A computer readable storage medium containing program instructions for obtaining traces of a program as recited in claim 14, wherein the program instructions for switching execution from the original code to the instrumented code and the program instructions for switching execution from the instrumented code back to the original code are defined to use return addresses during processing of function calls to effect the switching.

19. A computer readable storage medium containing program instructions for obtaining traces of a program as recited in claim 14, further comprising:

program instructions for defining a map of instruction addresses, the map of instruction addresses identifying correspondences between instruction addresses in the original code and instruction addresses in the instrumented code.

20. A computer readable storage medium containing program instructions for obtaining traces of a program as recited in claim 19, wherein the program instructions for switching execution from the original code to the instrumented code and the program instructions for switching execution from the instrumented code back to the original code are defined to use the map of instruction addresses to effect the switching.

\* \* \* \* \*